United States Patent [19]

Köhnlechner et al.

[11] Patent Number: 4,563,903
[45] Date of Patent: Jan. 14, 1986

[54] PRESSURE SENSOR

[75] Inventors: Rainer Köhnlechner, Peuzberg; Herbert Beeke, Hüllhorst; Hans Suckow, Bielefeld, all of Fed. Rep. of Germany

[73] Assignee: Ermeto Armaturen GmbH, Bielefeld, Fed. Rep. of Germany

[21] Appl. No.: 599,395

[22] Filed: Apr. 12, 1984

[30] Foreign Application Priority Data

Apr. 13, 1983 [DE] Fed. Rep. of Germany ....... 3313259

[51] Int. Cl.⁴ ............................................... G01L 9/06
[52] U.S. Cl. ...................................... 73/727; 73/706; 73/708; 338/4; 374/143
[58] Field of Search ................. 73/706, 708, 727, 721, 73/726, 720, 754, 431, DIG. 4; 338/4, 42; 374/143

[56] References Cited

U.S. PATENT DOCUMENTS 3,198,013 8/1965 Erdely .............................. 73/DIG. 4
3,237,138 2/1966 Kooiman et al. ....................... 338/4

Primary Examiner—Donald O. Woodiel
Attorney, Agent, or Firm—F. L. Tolhurst

[57] ABSTRACT

A pressure measuring device wherein a housing (1) includes a pressure sensor (2) in a pressure chamber (4) and an electronic circuit (14) in a non-pressurized chamber (6). Borings (7) extend between pressure chamber (4) and non-pressurized chamber (6) and accommodate contacts that electrically connect pressure sensor (2) and electronic circuit (14). A pressure membrane (3) cooperates with housing (1) to further define pressure chamber (4) and isolate the device from the fluid system. Pressure chamber (4) is filled with a medium that transmits the system pressure and provides an output signal to electronic circuit (14).

8 Claims, 3 Drawing Figures

PRESSURE SENSOR

BACKGROUND OF THE INVENTION

1. Field of the Invention

The subject invention is directed to devices for measuring pressures, especially high pressures, and temperatures in a hydraulic or pneumatic system. More specifically, the subject invention concerns devices that incorporate both a piezo-resistive pressure measuring cell and an electronic circuit in one housing to form an integral component.

2. Description of the Prior Art

The usual types of manometers known in the prior art are generally read off at intervals. Furthermore, such devices are frequently inadequate with regard to the precision required for certain measurements. In contrast, electronic measuring devices afford a continuous recording of the measured values and a rapid processing of the signals with a high degree of measuring accuracy.

Hydraulic systems are becoming increasingly complicated in the course of the rapid technical development. One consequence of this is that the hydraulic systems are placing increasingly higher demands on the required accuracy and switching speed of associated systems. As a result, there is a demand for improved pressure and temperature measuring devices that will not only continuously indicate that actual values measured by the electronic circuit, but will also give an instantaneous or real-time indication, of interference in the installation.

In piezo-resistive pressure measuring cells known in the prior art, the piezo-resistive semiconductor element (silicium chip) that is used for recording the pressure is connected to the corresponding contacts by means of binding wires. Thus, the entire sensor housing is standardized from semiconductor technology and is similar to that used for transistors, operational amplifiers, and the like. Consequently, such prior art sensor housings are unsuitable for measuring high pressures because the pressure influence on the housing distorts the measurement. Moreover, the housing often cannot withstand the higher pressures that are to be measured such that it is subject to deformation.

Accordingly, there was a need in the prior art for a pressure measuring device that would measure high pressures and that was also sturdy and could be automatically assembled.

Also, there was a need for a pressure measuring device that could readily be connected to hydraulic or pneumatic systems under high pressure and that would provide a highly accurate measurement.

SUMMARY OF THE INVENTION

In accordance with the subject invention, a threaded housing is divided into a pressure chamber that contains a pressure sensor, and a non-pressurized chamber that contains an electronic circuit. The pressure chamber and non-pressurized chamber are connected by borings that accommodate electrical contacts or connecting posts. The borings are aligned substantially parallel to the longitudinal axis of the housing and are generally arranged along a straight line. The pressure chamber is closed to the pressure side of the system by a pressure transferring membrane and is filled with an incompressible, pressure transmitting medium.

Preferably, the borings that accommodate the electrical contacts are conical such that the diameter of the boring decreases in the direction of the non-pressurized chamber. The electrical contacts are insulated from the wall of the boring by a glass filling.

Also preferably, the pressure transmitting medium is chemically inert and electrically insulating and has a pressure transmission ratio of substantially 1:1.

More preferably, the membrane is welded between a ring and a tapered cover plate that form components of the housing. The cover plate protects the membrane from mechanical damage. Alternatively, the membrane is welded between two rings that form components of the housing.

Most preferably, the pressure sensor is located adjacent the wall of the threaded housing that separates the pressure chamber from the non-pressurized chamber. The electronic circuit is a hybrid amplifier that amplifies low output signals from the pressure sensor.

Other details, objects and advantages of the invention will become apparent as the following description of certain presently preferred embodiments thereof proceeds.

BRIEF DESCRIPTION OF THE DRAWINGS

The accompanying drawings show certain presently preferred embodiments of the subject invention wherein.

DESCRIPTION OF THE PREFERRED EMBODIMENT

Figure 1:
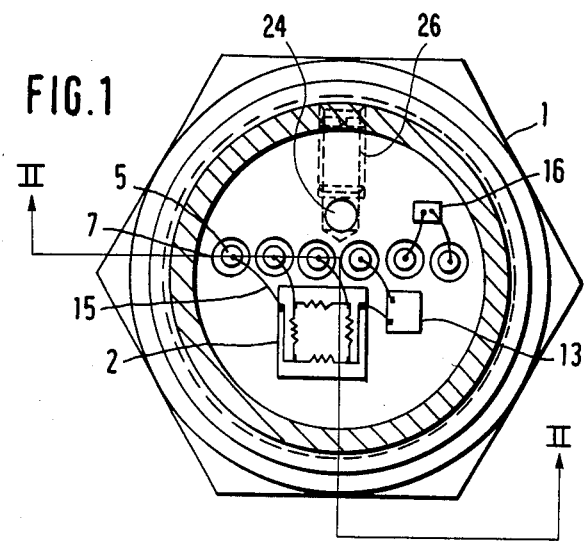
FIG. 1 is a radial cross section of a preferred embodiment of the subject invention taken through the threaded housing.
Figure 2:
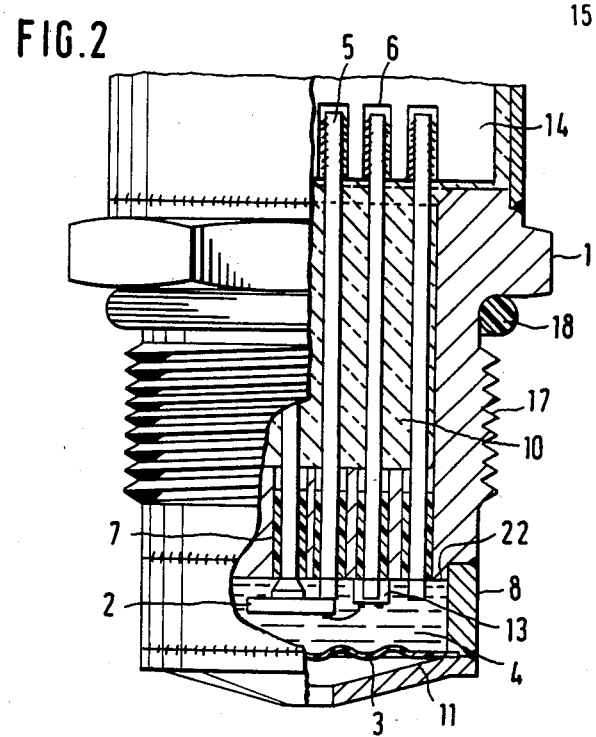
FIG. 2 shows a partial longitudinal section of the embodiment of FIG. 1.

As shown in FIGS. 1 and 2, the disclosed device for measuring high pressures and temperatures includes a threaded housing 1 having a pressure chamber 4 and a non-pressurized chamber 6. Borings 7 are located between pressure chamber 4 and non-pressurized chamber 6 and are aligned substantially parallel to the longitudinal axis of threaded housing 1.

Housing 1 includes a ring 8 and a conically increasing cover plate 11. Housing 1 cooperates with a pressure-transmitting membrane 3 that is welded between ring 8 and cover plate 11 to define pressure chamber 4. Housing 1 is also provided with a screw thread 17 and with an adjacently located o-ring 18 such that it can be threadingly connected to an adapter and, thereby, secured to a pressurized fluid system. Pressure-transmitting membrane 3 isolates pressure chamber 4 from the fluid system and cover plate 11 protects membrane 3 from being mechanically damaged.

Pressure chamber 4 contains an analog pressure sensor 2, analog temperature sensor 16, and a pressure switch 13. The balance of pressure chamber 4 is filled with chemically inert, electrically insulating, separating fluid that provides for a pressure conversion in a ratio of substantially 1:1.

Pressure sensor 2 is mounted on a connecting post that is located in one of borings 7. Connecting post 5 is provided with a head at the end adjacent pressure chamber 4. Mounting sensor 2 on connecting post 5 in this way makes pressure sensor 2 more sensitive to the pressure waves transmitted through the insulating fluid with less interference.

In the example of FIGS. 1 and 2, pressure switch 13 and temperature sensor 16 are connected to the wall of housing 1. Temperature sensor 16 adjusts the output of the pressure measuring device in response to changes in the temperature of the pressure transmitting fluid in pressure chamber 4. Pressure switch 13 is a foil pressure switch that is electrically connected to an electrical circuit that is connected to the electrical circuit of the pressure sensor. Pressure switch 13 has a specific, low switching pressure that is adjustable. The electrical circuit includes electrical resistors that are combinable to adjust the zero point of pressure sensor 2.

Pressure sensor 2, pressure switch 13 and temperature sensor 16 are electrically connected through electrical leads 15 and electrical contacts to an electronic circuit 14 that is located in non-pressurized chamber 6. Electronic circuit 14 is a hybrid amplifier that amplifies the relatively low output signals provided by pressure sensor 2.

The electrical contacts are located in a plurality of borings 7 that are arranged in a straight line. The linear arrangement of the electrical contacts thus provided is in contrast to conventional plugs as known in the prior art and provides an arrangement of electrical contacts that is compatible with electronic circuit 14.

The electrical contacts and connecting posts 5 are insulated from the wall of borings 7 by a pressure-proof insulation of glass filling. Housing borings 7 that accommodate electrical contacts and the connecting posts 5 are conically shaped with the boring diameter decreasing in the direction from pressure chamber 4 to non-pressurized chamber 6. In the disclosed embodiment, the taper is at a ratio of substantially 1:50. This conical shape supports against the pressure in pressure chamber 4 and protects the disclosed device against large pressure differentials between pressure chamber 4 and non-pressurized chamber 6.

In the operation of the embodiment of FIGS. 1 and 2, the piezo-resistive pressure sensor and the semiconductor chip 2 measures the systems pressure that is transmitted at a 1:1 ratio through membrane 3 and the insulating fluid in pressure chamber 4. Sensor 2 converts the measured pressure to a proportional voltage. The voltage output of sensor 2 is then amplified by integrated amplifier 14.

The integrated arrangement of the sensor 2 and amplifier 14 in housing 1 of the disclosed device provides short electrical connections between the sensor and the amplifier so that low-level signals can be better received and amplified. This arrangement, together with the mounting of sensor 2 on connecting post 5, provides a signals level that is particularly free from interference. Thus, the preferred embodiment of the subject invention can continuously and simultaneously detect and measure small changes in both pressure and temperature.

Experimental results of the subject invention show that measuring ranges go up to nominal pressures of 440 bar with 100% overload stability. Peak pressures of up to 600 bar can be covered with the temperature ranging between −20° C. to +120° C.

Figure 3:
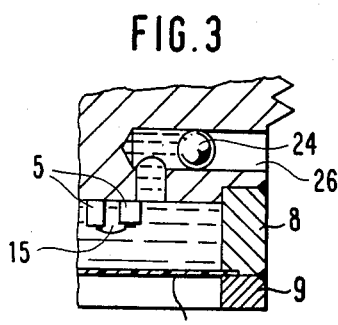
FIG. 3 shows a partial longitudinal section of an alternative embodiment of the subject invention, particularly showing the mounting of the diaphragm or membrane.

FIG. 3 shows a partial section of an alternative embodiment of the invention wherein a sealing element or ball 24 is located in an angle boring 26 in housing 1.

Two rings 8 and 9 are welded to housing 1 such that they form an integral component of the housing. Membrane 3 is welded between rings 8 and 9. Pressure sensor 2 and temperature sensor 16 are located inside pressure chamber 4.

While certain presently preferred embodiments of the subject invention are shown and described herein, the subject invention is not limited thereto, but can be otherwise variously embodied within the scope of the following claims.

We claim:

1. A device for measuring pressure in a fluid system, said device comprising:
   a housing having a pressure chamber and a non-pressurized chamber, said pressure chamber being connected to said non-pressurized chamber by conical borings that are aligned substantially parallel to the longitudinal axis of said housing and that are arranged along a straight line, the diameter of said boring decreasing in the direction from the pressure chamber to the non-pressurized chamber;
   electrical contacts and connecting posts that are located in said borings and that are insulated from the wall of the boring by a glass filling;
   an electronic circuit that is located in the non-pressurized chamber of said housing and that is electrically connected to said electrical contacts;
   a pressure sensor located in the pressure chamber of said housing and that is electrically connected to said electrical contacts;
   a pressure transferring membrane that separates said pressure chamber from the fluid system; and
   an incompressible, pressure transmitting medium that fills said pressure chamber.

2. The pressure measuring device of claim 1 wherein said housing includes first and second rings that form an integral portion thereof, said pressure transferring membrane being fastened between the first and second rings.

3. The pressure measuring device of claim 1 or 2 wherein the conicity of said borings is at the ratio of substantially 1:50.

4. The measuring device of claim 1 wherein said housing includes a ring and a tapered cover plate, said pressure transferring membrane being welded between the ring and the cover plate with the cover plate arranged to protect the membrane from mechanical damage.

5. The measuring devices of claim 1 wherein said housing includes a ring that cooperates with said membrane and said housing to define the pressure chamber, said pressure transmitting medium being chemically inert and electrically insulating and having a pressure transmission ratio of substantially 1:1.

6. The pressure measuring device of claim 1, 2, 4 or 5 wherein the pressure sensor is located adjacent a wall of said housing that separates the pressure chamber from the non-pressurized chamber.

7. The pressure measuring device of claim 1, 2, 4 or 5 wherein the electronic circuit includes a hybrid amplifier that amplifies output signals from the pressure sensor.

8. The pressure measuring device of claim 1, 2, 4 or 5 wherein the housing is threaded such that it can threadingly engage an adaptor that is arranged to be coupled to fluid systems.

* * * * *